United States Patent
Ward et al.

(10) Patent No.: US 6,184,873 B1
(45) Date of Patent: *Feb. 6, 2001

(54) PEN POSITIONING SYSTEM

(75) Inventors: Daniel R. Ward, San Mateo; Robert P. Wood, San Carlos; Jacob Harel, San Francisco; Rafi Holtzman, San Mateo, all of CA (US)

(73) Assignee: Electronics for Imaging, Inc., Foster City, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/009,645

(22) Filed: Jan. 20, 1998

(51) Int. Cl.[7] ............................................. G09G 5/00
(52) U.S. Cl. ................... 345/179; 345/173; 345/177; 178/19.07; 178/18.04; 178/19.02
(58) Field of Search .................................... 345/156–158, 345/178–180, 173; 367/128, 1; 178/18.01–18.04, 19.01–19.07, 17

(56) References Cited

U.S. PATENT DOCUMENTS

| 4,246,439 | * | 1/1981 | Romein ............................ 178/18 |
| 4,506,354 | * | 3/1985 | Hansen ............................ 367/101 |
| 4,577,057 | * | 3/1986 | Blesser ............................ 178/18 |
| 4,902,858 | * | 2/1990 | Yamanami et al. ............ 178/19 |
| 4,963,703 | | 10/1990 | Phillips et al. ................. 178/19 |
| 5,500,492 | * | 3/1996 | Kobayashi et al. ............. 178/18 |
| 5,557,301 | * | 9/1996 | D'Aviau De Piolant ....... 345/179 |
| 5,717,168 | * | 2/1998 | DeBuisser et al. ............. 178/19 |

FOREIGN PATENT DOCUMENTS

| 772149A1 | 5/1997 | (EP) ........................ G06K/11/18 |
| WO94/11844 | 5/1994 | (WO) ....................... G06K/11/14 |

* cited by examiner

*Primary Examiner*—Amare Mengistu
*Assistant Examiner*—Jimmy H. Nguyen
(74) *Attorney, Agent, or Firm*—Michael A. Glenn

(57) ABSTRACT

A pen positioning system is provided, in which a pen, having multiple output elements, is adapted to accurately determine the location of the pointing tip of the pen, in relation to an electronic tablet. The output elements, preferably ultrasonic transmitters having distinct frequencies, are located a fixed distance from each other, and are also related in space to the pointing tip of the pen. The geometric relationship between the output elements and the pointing tip of the pen allows the location of the pointing tip to be determined, independent of the angle which the pen is inclined against the surface of the writing tablet. A detection system is used to receive the output signals from the output elements, isolate the output signals from each other, and process them independently to determine the location of the output elements and of the pointing tip of the pen. Alternative embodiments include an additional output element on a pressure sensitive shell of the pen, which allows the pen to accurately provide pressure sensitive output signal information.

12 Claims, 4 Drawing Sheets

PEN POSITIONING SYSTEM

FIELD OF THE INVENTION

The invention relates to the field of electronic input systems. More particularly, the invention relates to a system for determining the position of an electronic pointing device.

BACKGROUND OF THE INVENTION

Digitizing pen and tablet systems are used for a variety of electronic applications. These systems typically include a tablet, a position indicating pen, and associated electronics for determining the interaction between the tablet and the position indicating pen. A digital data signal is typically derived to represent the relative position of the position indicating pen and the tablet.

The calculated location of current prior art pens, in relation to an electronic tablet, have a systematic user error of approximately ±10 pixels. This error is determined solely by the angle at which the pen is inclined towards the tablet, and the distance from the tip of the pen to the center of a transmitting element.

M. Phillips, T. Philbin, and B. Blesser, *Coordinate Determining Device Using Spatial Filters*, U.S. Pat. No. 4,963,703 (Oct. 16, 1990) disclose a digitizing tablet, in which "two sets of circuitous conductive lines form grids each connected at one end to a surrounding conductive loop. All outputs are measured from the conductive loop as a multiplexor sequentially grounds the grids one at a time. The outputs are fed through linear spatial filters which are used to produce intermediate signals which are in turn combined to arrive at raw position signals for a position indicating coil located over the work surface. Separate sets of linear spatial filters may be used to produce two raw position signals differently responsive to tilt which can then be combined to arrive at a true position insensitive to tilt". Phillips et al. also disclose a stylus having a single conductive coil, which is used as a position indicating implement over a work surface.

The disclosed prior art systems and methodologies thus provide basic pen and tablet positioning systems for determining the spatial relationship between a pen and a tablet, but fail to provide an accurate means for determining the position of the tip of the pen, independent of the angular displacement of the pen in relation to the tablet. J. Romein, *Acoustic Writing Combination Comprising a Stylus With An Associated Writing Tablet*, U.S. Pat. No. 4,246,439 (Jan. 20, 1981) discloses an acoustic writing stylus provided with two ultrasonic sound sources that are situated at different distances from a stylus tip and that are operated to alternately produce ultrasonic signals, thereby providing a scheme for more accurately determining the position of the stylus tip. However, because this system requires that alternate ultrasonic bursts at the same frequency produced by each of the ultrasonic sound sources be received to measure the respective distances of each of the sound sources from a receiver (microphone) there is a likelihood that angular movement of the stylus between bursts can alter the measured distance and produce an inaccurate determination of stylus tip position. The development of a more accurate, improved pen positioning system would constitute a major technological advance.

SUMMARY OF THE INVENTION

An improved pen positioning system is provided, in which a pen, having multiple output elements, is adapted to determine the location of the pointing tip of the pen accurately, in relation to an electronic tablet. The output elements, preferably ultrasonic transmitters having distinct frequencies, are located a fixed distance from each other, and are also related in space to the pointing tip of the pen. The geometric relationship between the output elements and the pointing tip of the pen allows the location of the pointing tip to be determined, independent of the angle which the pen is inclined against the surface of the writing tablet. A detection system is used to receive the output signals from the output elements, isolate the output signals from each other, and process them independently to determine the location of the output elements and of the pointing tip of the pen.

Alternative embodiments include an additional output element on a pressure sensitive shell of the pen, which allows the pen to accurately provide pressure sensitive output signal information.

DETAILED DESCRIPTION OF PREFERRED EMBODIMENTS

Figure 1:
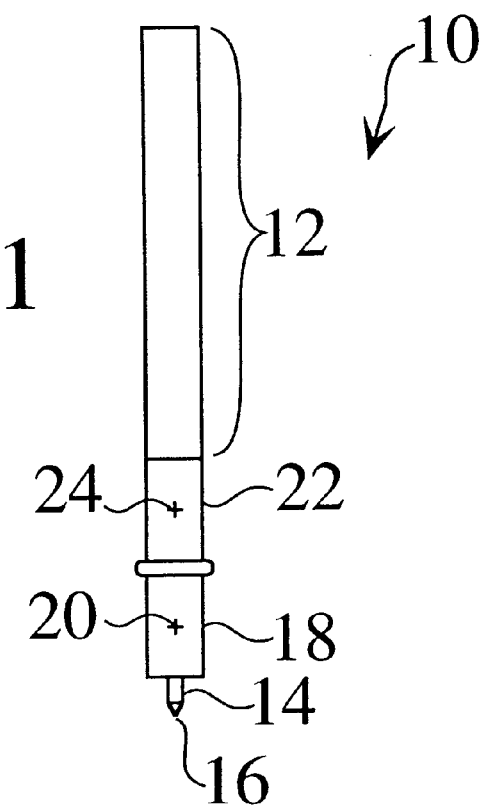
FIG. 1 is a side view of a dual output element pen.
Figure 2:
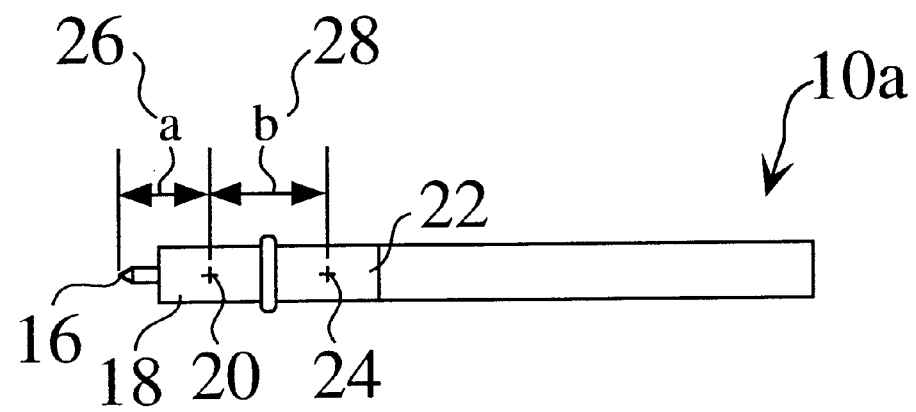
FIG. 2 is a detailed side view of a dual output element pen, which shows spacing between the pen tip and the center of each output element.
Figure 3:
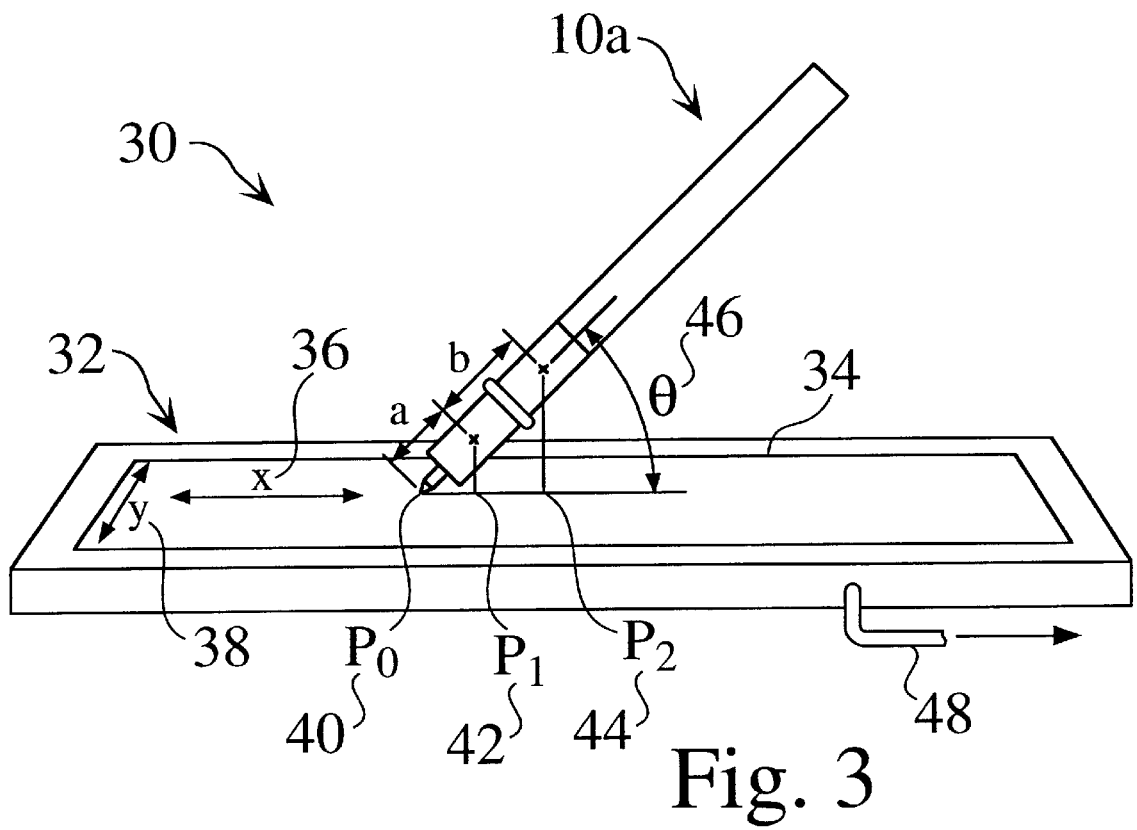
FIG. 3 is a perspective view of a dual output element pen at an inclined angle in relation to an electronic tablet.

FIG. 1 is a side view of a dual output element pen 10a. The pointing end 14 of the pen 10 has a pointing tip 16, with which a user points to or draws upon the surface 34 (FIG. 3) of an electronic tablet 32 (FIG. 3). A first output element 18 is located on the pen 10, and has a first point source 20 for a first output signal. A second output element 22 is located on the pen 10, and has a second point source 24 for a second output signal. FIG. 2 is a detailed side view of the dual output element pen 10a, which shows the spacing between the pen tip 16 and the point sources 20,24 of each output element 18, 22. The first distance 26 is denoted as "a" between the pointing tip 16 and the first point source 20 of the first output element 18. The second distance 28 is denoted as "b" between the first point source 20 of the first output element 18 and the second point source 24 of the second output element 22.

The first output element 18 and the second output element 22 of the positioning pen 10a are preferably ultrasonic transmitters. The first and second output elements 18,22 transmit output signals of distinct frequencies, which allows the location of the pen tip 16 to be determined accurately, as described below. The detection system isolates the output signals, and processes them independently.

Figure 4:
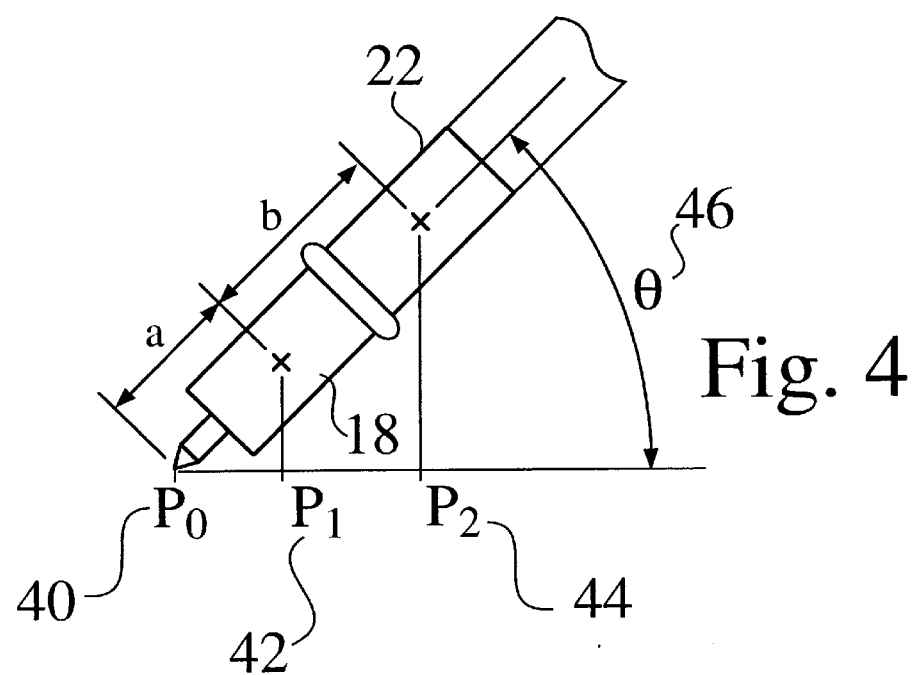
FIG. 4 shows the relative geometry between an inclined dual output element pen and an electronic tablet.
Figure 5:
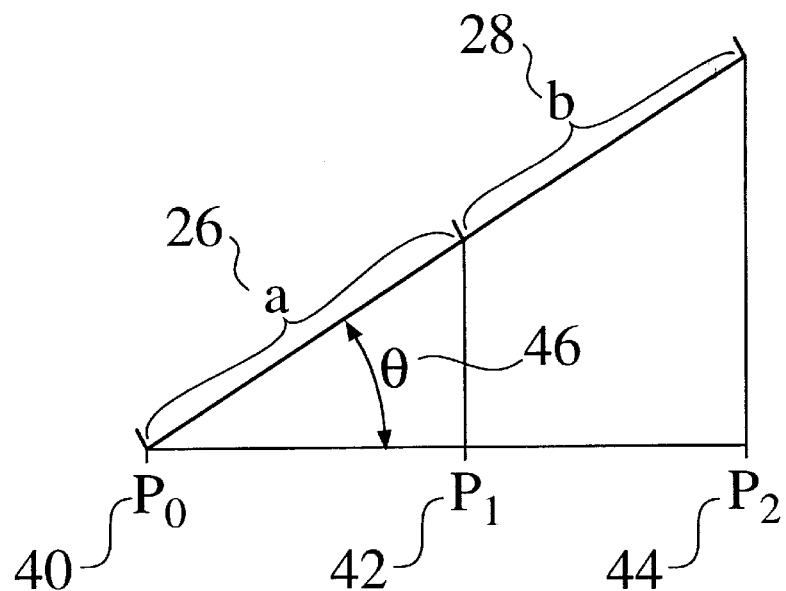
FIG. 5 illustrates the geometric relationship between an inclined dual output element pen and an electronic tablet.

FIG. 3 is a perspective view of the positioning pen system 30, in which a dual output element pen 10a is shown at an inclined angle 46 in relation to an electronic tablet 32, indicated as θ. The electronic tablet 32 has a planar work surface 34, which includes an X coordinate axis 36, and a Y coordinate axis 38. Signals from the electronic tablet 32 are output through cable 48 for external processing. FIG. 4 shows the relative geometry between an inclined dual output element pen 10a and an electronic tablet 32. Point $P_0$ (40) corresponds to the location of the pointing tip 16 of the pen 10a on the tablet 32. Point $P_1$ (42) corresponds to the projected location of the first point source 20 of the first output element 18 of the pen 10a onto the tablet 32. Point $P_2$ (44) corresponds to the projected location of the second point source 24 of the second output element 22 of the pen 10a onto the tablet 32. FIG. 5 illustrates the geometric relationship between the inclined dual output element pen 10a and the electronic tablet 32, for any angle θ between the pen 10a and the tablet 32.

For any angle θ between the pen 10 and the tablet 32, $$\{a/(P_0-P_1)\}=\{b/(P_1-P_2)\}. \quad (1)$$

Therefore, $$\{(a/b)*((P_1-P_2)\}=(P_0-P_1), \text{ or} \quad (2)$$

$$P_0=P_1+\{(a/b)*(P_1-P_2)\}. \quad (3)$$

The maximum error in the measurements of $P_1$ and $P_2$ is approximately ±2 pixels. The total system error is approximately ±4 pixels.

Figure 6:
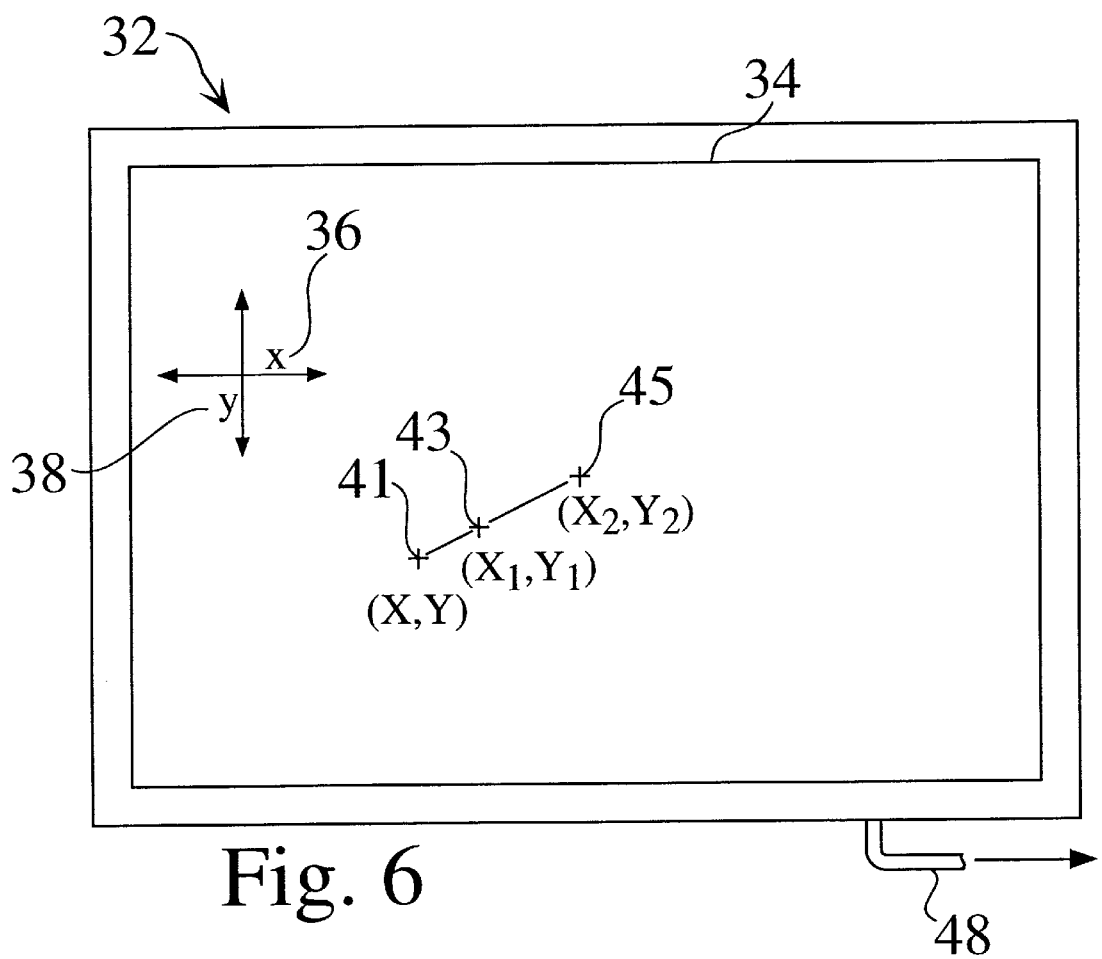
FIG. 6 shows the projected x and y coordinates of a pen tip and dual output elements for an inclined dual output element pen onto an electronic tablet.

FIG. 6 shows the projected x and y coordinates of the pen tip 16, first output element 18, and second output element 22 for an inclined pen 10 onto an electronic tablet 32. The system produces the projected coordinates $X_1$ and $Y_1$ of the first point source 20 of the first output element 18. The system also produces the projected coordinates $X_2$ and $Y_2$ of the second point source 24 of the second output element 22. Using these two points 43 and 45, and the known measurement of the positioning pen 10, the location (X,Y) 41 of the pen tip 16 is determined mathematically.

The location of X is given by:

$$X=X_1+(a/b)*(X_1-X_2), \quad (4)$$

and the location of Y is given by:

$$Y=Y_1+(a/b)*(Y_1-Y_2) \quad (5)$$

Figure 7:
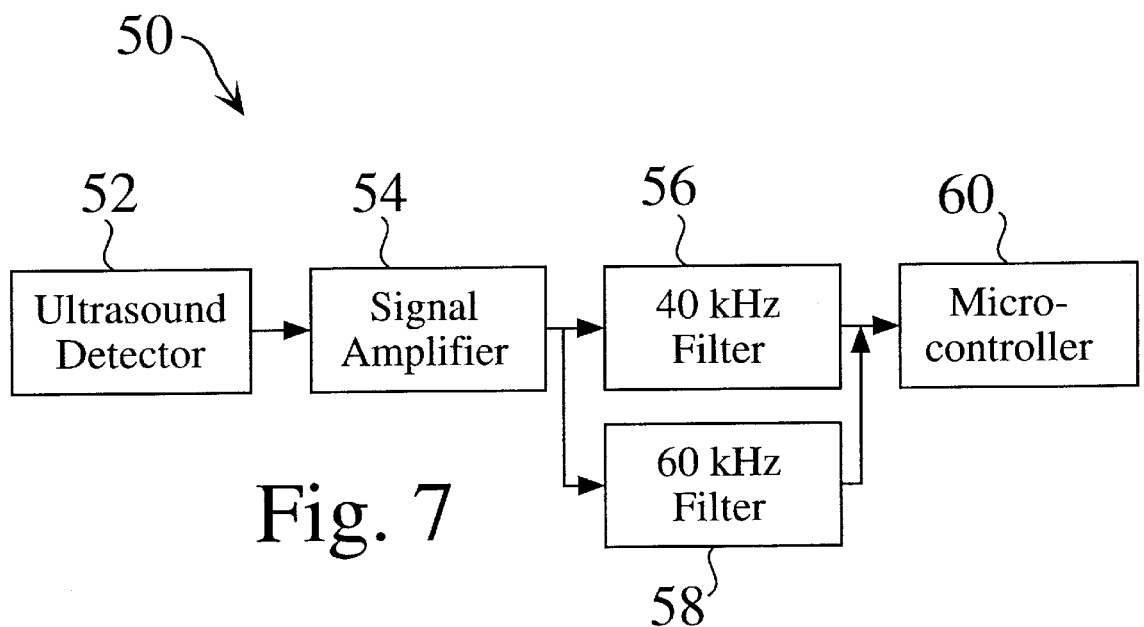
FIG. 7 is a flow chart which illustrates how the signal from a dual output element pen relative to an electronic tablet is processed.

Multiple Output Signal Detection Process. FIG. 7 is a flow chart 50 which illustrates how the signal from a dual output element pen 10 relative to an electronic tablet 32 is processed. The multiple output signal detection process to determine the location of the tip 16 of the positioning pen 10 comprises the following steps:

i) inputting a plurality of pen signals to an ultrasound detector 52;

ii) amplifying the input signals 54, if necessary;

ii) feeding the amplified signals through a plurality of filters (56,58) to produce the X and Y components of each output element 18,22;

iv) feeding the X and Y components of each output element 18,22 to a microcontroller 60; and v) determining the location of the pen tip 16 mathematically 60.

System Advantages. The pen positioning system 30 provides many advantages over prior pen positioning systems.

As the pen 10 is located at an angle θ, in relation to an input tablet 32, the angular displacement of the pen 10 can be compensated for. The use of two transmitting elements 18, 22 provides a vector between the two points representing the two transmitting elements, which are then used to accurately locate the tip 16 of the pen 10 in relation to the tablet 32.

The dual output element pen 10 produces two points in space, related to each other, and each related to the tip 16 of the pen 10. By having a first reference point 20 of a first output element 18, and a second reference point 24 of a second output element 22, in which there is a fixed spatial relationship between the first reference point 20 and the second reference point 24, the location of the pen tip 16 can be accurately determined.

Figure 8:
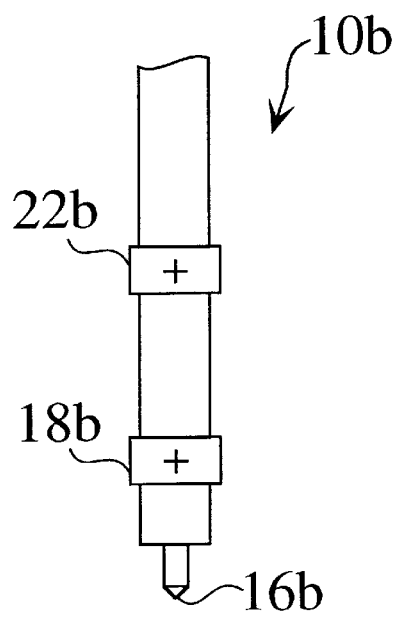
FIG. 8 is a partial side view of an alternate embodiment of a dual output element pen.

Alternate Embodiments. FIG. 8 is a partial side view of an alternate embodiment of a dual output element pen 10b, in which a first output element 18b and a second output element 22b are located a distance from each other.

Figure 9:
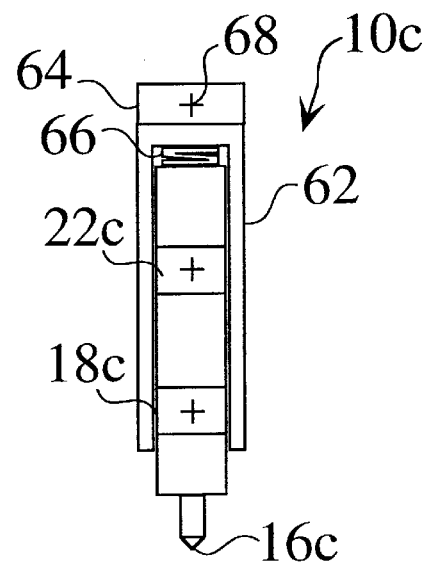
FIG. 9 is a partial side view of a dual output element pen having an integrated pressure sensitive signal.

FIG. 9 is a partial side view of a dual output element pen 10c having an integrated pressure sensitive signal. An outer shell 62, having an output element 64, is slidably mounted about the body of the pressure sensitive pen 10c, and is biased by a spring 66. The third output element is adapted to transmit a third signal having a third frequency, in which the third frequency is different from the first frequency and the second frequency. The location of the pointing tip 16c is accurately located in respect to an electronic tablet, as described above. Applied pressure from a user acts to displace the shell reference point 68 of the shell output element 64, in relation to the body of the pen 10c. The relative distance between the shell reference point 68 and the body of the pen 10c can be used to communicate pressure to external systems. This pressure signal can be used for many applications, such as painting or drawing applications, in which the applied pressure communicates the width of an electronic paint stroke in a digital painting software program.

Although the pen positioning system and its methods of use are described herein in connection with computer input systems, the techniques can be implemented for other control or display devices, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A positioning pen, comprising:

a pen tip;

a first output element having a first point source adapted to transmit a first signal having a first ultrasonic frequency, the first point source of the first output element located a first distance away from the pen tip; and a second output element having a second point source adapted to transmit a second signal having a second ultrasonic frequency at substantially the same time as the first signal, the second frequency different from the first frequency for distinguishing between the first signal and the second signal, the second point source of the second output element located a second distance away from the pen tip, the second distance different than the first distance.

2. The pen positioning system of claim 1, further comprising:

an outer shell slidably biased in relation to the pen tip, the first output element, and the second element; and a third output element attached to the outer shell, the third output element adapted to transmit an outer shell displacement signal having a third frequency, the third frequency different from the first ultrasonic frequency and the second ultrasonic frequency.

3. The positioning pen of claim 2, wherein the third output element is an ultrasonic transmitter.

4. A pen positioning system, comprising:

a pen having a pen tip, a first output element having a first point source located a first distance away from said pen tip, the first output element adapted to transmit a first signal having a first ultrasonic frequency, and a second output element having a second point source located a second distance away from the pen tip, the second distance different than the first distance, the second output element adapted to transmit a second signal at substantially the same time as the first signal, the second signal having a second ultrasonic frequency different from the first ultrasonic frequency for distinguishing between the first signal and the second signal;

a detector for receiving the first signal from the first point source and the second signal from the second point source;

a plurality of filters connected to the detector for isolating the first signal and the second signal; and means for receiving the isolated first signal and the isolated second signal from the plurality of filters, for determining the location of the first point source of the first output element based upon the isolated first signal, for determining the location of the second point source of the second output element based upon the isolated second signal, and for determining the location of the pen tip based upon the determined location of the first point source, the first distance between the first point source and the pen tip, the determined location of the second point source, and the second distance between the second point source and the first point source.

5. The positioning pen system of claim 4, further comprising:

an outer shell slidably biased in relation to the pen tip, the first output element, and the second output element;

a third output element attached to the outer shell, the third output element adapted to transmit an outer shell displacement signal having a third frequency, the third frequency different from the first ultrasonic frequency and the second ultrasonic frequency;

wherein the detector is adapted for receiving the outer shell displacement signal;

wherein the plurality of filters for isolating the first signal and the second signal is adapted for isolating the outer shell displacement signal from the first signal and the second signal; and means for receiving the isolated outer shell displacement signal and for determining the location of the third output element in relation to the location of the first output element and the second output element.

6. The positioning pen of claim 5, wherein the third output element is an ultrasonic transmitter.

7. The positioning pen of claim 4, wherein the pen tip position is determined in accordance with the formula:

$$P_0 = P_1 + \{(a/b)*(P_1 - P_2)\}$$

where $P_1$ is the determined location of the first point source onto an electronic tablet; $P_2$ is the determined location of the second point source onto the electronic tablet; a is the first distance between the pen tip and the first point source; and b is the distance between the first point source and the second point source.

8. A process, comprising:

providing a pen having a pen tip, a first output element having a first point source located a first distance away from the pen tip, the first output element adapted to transmit a first signal having a first ultrasonic frequency, and a second output element having a second point source located a second distance away from the pen tip, the second distance different than the first distance, the second output element adapted to transmit a second signal at substantially the same time as the first signal, the second signal having a second ultrasonic frequency different from the first ultrasonic frequency for distinguishing between the first signal and the second signal;

detecting the first signal and the second signal;

feeding the first signal and the second signal through a plurality of filters to isolate the first signal and the second signal; and determining the locations of the first point source of the first output element based upon the detected and isolated first signal, the second point source of the second output element based upon the detected and isolated second signal; and determining the location of the pen tip, based upon the determined location of the first point source and the determined location of the second point source.

9. The process of claim 8, further comprising:

amplifying the first signal and the second signal.

10. The process of claim 8, further comprising:

providing an outer shell slidably biased in relation to the pen tip, the first output element, and the second output element;

providing a third output element attached to the outer shell, the third output element adapted to transmit an outer shell displacement signal having a third frequency, the third frequency different from the first ultrasonic frequency and the second ultrasonic frequency;

detecting the outer shell displacement signal;

isolating the outer shell displacement signal from the first signal and from the second signal; and determining the location of the third output element in relation to the location of the first output element and the second output element.

11. The process of claim 10, wherein the third output element is an ultrasonic transmitter.

12. The process of claim 10, further comprising:

amplifying the third signal.

* * * * *